United States Patent
Appel et al.

(10) Patent No.: US 10,001,395 B2
(45) Date of Patent: Jun. 19, 2018

(54) METHOD OF INTERPRETING NMR SIGNALS TO GIVE MULTIPHASE FLUID FLOW MEASUREMENTS FOR A GAS/LIQUID SYSTEM

(71) Applicant: SHELL OIL COMPANY, Houston, TX (US)

(72) Inventors: Matthias Appel, Houston, TX (US); John Justin Freeman, Pattison, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days. days.

(21) Appl. No.: 15/103,429

(22) PCT Filed: Dec. 5, 2014

(86) PCT No.: PCT/US2014/068692
§ 371 (c)(1),
(2) Date: Jun. 10, 2016

(87) PCT Pub. No.: WO2015/088888
PCT Pub. Date: Jun. 18, 2015

(65) Prior Publication Data
US 2016/0313159 A1    Oct. 27, 2016

Related U.S. Application Data

(60) Provisional application No. 61/915,607, filed on Dec. 13, 2013.

(51) Int. Cl.
*G01F 1/56* (2006.01)
*G01V 3/00* (2006.01)
(Continued)

(52) U.S. Cl.
CPC ............... *G01F 1/716* (2013.01); *G01F 1/74* (2013.01); *G01F 25/0007* (2013.01)

(58) Field of Classification Search
None
See application file for complete search history.

(56) References Cited

U.S. PATENT DOCUMENTS 4,785,245 A    11/1988   Lew et al.
5,278,501 A *  1/1994   Guilfoyle ........... G01R 33/4816
                                                      324/300
(Continued)

OTHER PUBLICATIONS

Appel, M., et al., Appel, M., et al.: SPE 141465 Robust Multi-Phase Flow Measurement Using Magnetic Resonance Technology, SPE Middle East Oil and Gas Show and Conference, Sep. 25-28, 2011, Manama, Bahrain, Jan. 1, 2011, pp. 1-20, XP055173490, https://www.onepetro.org/conference-paper/SPE-141465-MS.

*Primary Examiner* — Harshad R Patel

(57) ABSTRACT

A method for assessing a gas phase in a flowing multi-phase fluid comprises flowing the fluid through magnetic resonance and pre-polarization modules and applying to the fluid a radio-frequency pulse sequence at least once with and at least once without a magnetic field gradient. The method further includes measuring an NMR signal. The method also includes using a calibration between the ratio of slope and intercept of the NMR signal and flow velocity for at least one non-gas phase with the gradient applied to determine that phase's velocity. A calibration between the signal intensity of the liquid phases as function of flow velocity is used, with and without gradient, to correct the gradient-induced attenuation of the liquid signals and to calculate a gradient-corrected signal intensity of the liquid phases without a magnetic field gradient. Additionally, the method includes (Continued)

subtracting the gradient-corrected signal intensity from the NMR signal to calculate the volumetric fraction of the liquid phase.

8 Claims, 3 Drawing Sheets

(51) Int. Cl.
  *G06F 19/00* (2018.01)
  *G01R 33/44* (2006.01)
  *G01F 1/716* (2006.01)
  *G01F 1/74* (2006.01)
  *G01F 25/00* (2006.01)

(56) References Cited

U.S. PATENT DOCUMENTS

| | | |
|---|---|---|
| 6,046,587 A | 4/2000 | King et al. |
| 6,111,408 A | 8/2000 | Blades et al. |
| 6,268,727 B1 | 7/2001 | King et al. |
| 6,452,390 B1 | 9/2002 | Wollin |
| 6,737,864 B2 | 5/2004 | Prammer et al. |
| 6,825,657 B2 | 11/2004 | Kleinberg et al. |
| 6,891,369 B2 | 5/2005 | Hurlimann et al. |
| 7,719,267 B2 | 5/2010 | Pusiol |
| 7,872,474 B2 | 1/2011 | Pusiol et al. |
| 8,143,887 B2 | 3/2012 | Pusiol |
| 8,212,557 B2 | 7/2012 | Pusiol et al. |
| 2004/0001532 A1 | 1/2004 | Mason, Jr. et al. |
| 2004/0140800 A1* | 7/2004 | Madio .............. G01V 3/32 324/303 |
| 2005/0040822 A1 | 2/2005 | Heaton |
| 2006/0020403 A1 | 1/2006 | Pusiol |
| 2006/0122779 A1 | 6/2006 | Minh et al. |
| 2007/0164737 A1* | 7/2007 | Pusiol ............ G01R 33/5617 324/306 |
| 2008/0174309 A1 | 7/2008 | Pusiol et al. |
| 2010/0226556 A1* | 9/2010 | Kumai ............ G01R 33/5614 382/131 |

* cited by examiner

METHOD OF INTERPRETING NMR SIGNALS TO GIVE MULTIPHASE FLUID FLOW MEASUREMENTS FOR A GAS/LIQUID SYSTEM

FIELD OF THE INVENTION

The invention relates generally to a method and device for a magnetic resonance-based measurement and analysis of multi-phase flow regimes in a transport or production pipe. More particularly, the present invention relates to the determination of liquid and gas fractions in multi-phase flow.

BACKGROUND OF THE INVENTION

Many techniques exist in the literature for using magnetic resonance techniques for direct, often real-time, analysis of various properties of liquids transported through pipelines For example, some properties of fluids extracted from a subsurface reservoir can be determined in real time and at in-situ reservoir temperatures and pressures based on the measurement of the fluid's transverse ($T_2$) and longitudinal ($T_1$) relaxation times, and as well as their self-diffusivity (D). The parameters derived from such measurements include, e.g., the relative fractions of hydrocarbons and water that have contributed to the measured NMR signal, the level of contamination of the hydrocarbon fluid phase by infiltrations of water or drilling mud, and estimations of hydrocarbon viscosity.

These measurements can be realized both as surface and subsurface experiments and often reduce ambiguities associated with samples extraction and sample transport. Some analytical methods based on Magnetic Resonance and its associated devices are described, for example, in the U.S. Pat. No. 6,111,408, "Nuclear Magnetic Resonance Sensing Apparatus and for Techniques down hole Measurements;" U.S. Pat. No. 6,737,864 B2, "Magnetic Resonance Fluid Analysis and Method;" U.S. Pat. No. 6,825,657 B2, "Magnetic Resonance for Method Characterizing Fluid Samples Withdrawn from Subsurface Earth Formations;" U.S. Pat. No. 6,891,369 B2, "Magnetic Resonance Method and Logging for Apparatus Fluid Analysis;" U.S. 2005/0040822 A1, "Multi-measurements NMR Analysis based on Maximum Entropy;" U.S. 2006/0122779 A1, "Interpretation for Methods NMR Diffussion-T2 Maps;" U.S. Pat. No. 7,872,474, "Magnetic Resonance Based Apparatus and Method to Analyze and to Measure the Bi-Directional Flow Regime in a Transport or a Production Conduit of Complex Fluids, in Real Time and Real Flow-Rate," U.S. Pat. No. 7,719,267, "Apparatus and Method for Real Time and Real Flow-Rates Measurements of Oil and Water Cuts from Oil Production," and the references contained therein.

In U.S. Pat. No. 4,785,245, magnetic resonance is used to determine the relative fractions of petroleum and water and the flow velocity in a fluid conduit. The determination of petroleum and water fractions is generally carried out by means of the magnetic resonance signal that is weighted by the individual spin-lattice relaxation times ($T_1$) of either fluid component. This technique requires that the individual transverse relaxation time of the water phase in the hydrocarbon/water mixtures differs from that of the oil phase. For most applications, this requirement is sufficiently fulfilled. In addition, for hydrocarbon mixtures comprised of low- and high viscosity components it is also often possible to measure the ratio of the light- and heavy components as long as their respective values of longitudinal relaxation times is sufficiently different to isolate the corresponding magnetic resonance signals.

For the measurement of flow-rates two basic principles can be identified.

The determination of the fluid flow-rate through the measurement of "flight time" of fluids between two magnetic resonance spectrometers: (or between two sensors of a single spectrometer). See, for example, U.S. Pat. No. 6,046, 587 "Measurements of Flow Fractions, Flow Velocities and Flow Rates of a Multiphase Fluid using NMR Sensing," or U.S. Pat. No. 6,268,727 "Measurements of Flow Fractions, Flow Velocities and Flow Rates of a Multiphase Fluid using ESR Sensing." Both patents disclose a sensor that uses at least two magnetic resonance spectrometers or one magnetic resonance and another electron paramagnetic resonance spectrometer. The basic principle of this approach is based on what is known as the "flight or passage time" of magnetic resonance-excited fluid nuclei between both spectrometers. Another variant of this method is US patent application 2004/001532, "Method and procedure to measure fluid flow and fluid fraction, and equipment used to that end." In this case there is only one electronic part, shared by two sensor coils. The operation principle of the approach described in the '532 reference is the same as outlined in the '727 reference, namely, the flow velocity of water and hydrocarbon molecules is separately measured via the respective time required for each component to straddle the space between the two sensor coils. While theoretically correct, this "time-of-flight" approach has little practical feasibility for oil-field applications, as it is limited to relatively slow flow velocities and is expensive to implement.

Another method for measuring fluid flow by means of magnetic resonance is based on the spatial encoding of the flow velocity by means of a magnetic field gradient that is oriented in the direction of the flow. This approach employs magnetic field gradients (static and/or electronically pulsed) to modulate the precession phase of protons spins. A flow meter with fluid phase separation that uses pulsed electromagnetic field gradients is disclosed, for instance, in U.S. Pat. No. 6,452,390, "Magnetic Resonance Analyzing Flow Meter and Flow Measuring Method." This method has the disadvantage that the maximum flow velocities detectable are proportional to the intensity of the applied field gradient pulses. Therefore, the measurement of realistic flow velocities as encountered during hydrocarbon production and transport requires magnetic field gradients of high intensity, which also need to be switched on and off during extremely short time periods. Such gradient pulses are difficult to achieve, in particular across sensed volumes that are comparable to the cross-section of conduits typical used in oil-field applications. Consequently, this methodology is generally restricted to measurements of relatively low flow rates.

A version of this method that includes applying a permanent longitudinal gradient field is described in US patent application US 2006/0020403, "Device and Method for real time direct measurement of the Flow-Rate of a Multi-Component Complex Fluid." The '403 reference discloses a flow meter and the measurement of fluid fractions in multiphase flow by one coil associated to a magnet of slightly oblique flat polar faces. The device generates a magnetic field gradient in the direction of fluid flow, in addition to the constant magnetic field required to detect the magnetic resonance signal. The spatial encoding of the temporal position of the resonant nuclei is realized by means of the linear magnetic field gradient in the volume that is probed by the excitation- and detection magnetic resonance coil. For high flow speeds, this gradient must be increased to achieve the corresponding encoding of the protons that compose the circulating complex fluid. While larger permanent magnetic field gradients can, in principle, be realized using different magnet shapes, this measurement approach reaches its limit because the increase in magnetic field gradient intensity is accompanied by a corresponding increase in the frequency content of the detected magnetic resonance signal. For a given bandwidth (of the electronics used for transmitting and receiving the radio-frequency signals), this broadening of the magnetic resonance line width—as represented in the frequency domain after the time-domain signal has been Fourier-transformed—causes the signal-to-noise ratio of the detected signal to deteriorate. This, in turn, causes a reduction in measurement precision and increases the time required for an individual measurement. Furthermore, it is possible that the detected NMR signal originates only from fluids located within a thin slice oriented perpendicular to the direction of the magnetic field gradient rather than from all fluids in the pipe.

The foregoing principles are advanced further in U.S. Pat. Nos. 8,143,887 and 8,212,557, the disclosures of which also include an exemplary system and methods for making NMR measurements of multiphase flow.

Except to the extent they contain statements that contradict statements made in the present application, all of the references mentioned herein are incorporated herein in their entireties.

The approaches outlined above are limited to the measurement of the average flow-rates of the fluid components. It has been discovered, however, that because these methods rely on a quantifiable diffusion contrast between the liquid and gas phases, they do not always give accurate results at low gas pressures or low gas velocities. Thus it remains desirable to provide a method and apparatus that can more precisely assess the velocity profile of each individual component of a multiphase fluid without using time-of-flight measurements.

SUMMARY OF THE INVENTION

According to preferred embodiments, the invention includes a method and apparatus that can more precisely assess the velocity profile of each individual component of a multiphase fluid without using time-of-flight measurements. Specifically, one embodiment of the present method comprises providing a measurement and analysis magnetic resonance module through which the multi-phase fluid flows and a pre-polarization module through which the multi-phase fluid flows before entering the magnetic resonance module, flowing the multi-phase fluid through the pre-polarization module and the magnetic resonance module, as the fluid flows through the magnetic resonance module, applying to the fluid an radio-frequency pulse sequence at least once in the presence of a magnetic field gradient and at least once in the absence of a magnetic field gradient and measuring the intensity of a pre-determined number of spin echoes that are produced by the RF pulse sequence, using a first calibration between the ratio of slope and intercept of the measured spin echoes and flow velocity for at least one non-gas phase with the magnetic field gradient applied to determine the flow velocity of that non-gas phase, using a second calibration of the signal intensity of the non-gas phases as function of flow velocity, with and without magnetic field gradients applied, to correct the gradient-induced attenuation of the non-gas signal and to calculate a gradient-corrected signal intensity of the non-gas phase, subtracting the gradient-corrected signal intensity of the non-gas phase from the NMR signal of the multi-phase fluid measured at the liquid flow velocity to determine signal that corresponds to the gas phase, and using the gas signal to determine the volumetric fraction and flow velocity of the gas phase.

The radio-frequency pulse sequence may be a CPMG pulse sequence and the magnetic field gradient may be pulsed or constant during the RF sequence. The determination of gas flow velocity may include using a flow rate calibration for pure gas in conjunction with the slope and intercept of the calculated gas signal. The calculations of gas volume and gas velocity may be performed for a plurality of horizontal or non-horizontal segments of the cross-sectional area of the flow. Calculation of the volumetric flow rate of the gas phase may include multiplying the volume fraction of the gas by the gas flow velocity. The present method may advantageously be used to assess a multi-phase fluid that includes a gas flowing at a pressure less than 15 MPa.

It will be understood that while the following description may include references to fluid flow in a single direction, the invention has equal applicability to bi-directional flow.

Similarly, where the article "a" is used in a declaration of or in a description of the presence of a component in the apparatus of this invention, it must be understood, unless this declaration or description expresses explicitly the contrary, that the use of the indefinite article does not limit the presence of the component in the apparatus to one in number.

BRIEF DESCRIPTION OF THE DRAWINGS

For ease in understanding the following description, reference is made to the accompanying Drawings, in which.

DETAILED DESCRIPTION OF A PREFERRED EMBODIMENT

Figure 1:
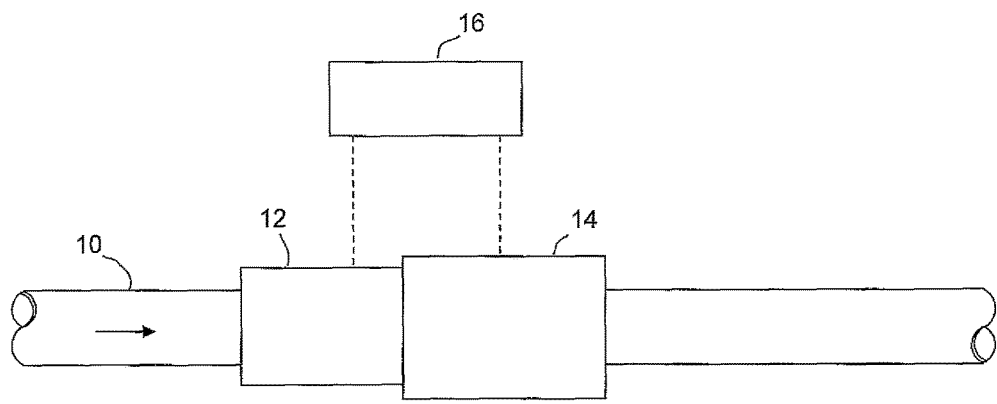
FIG. 1 is a schematic illustration of a system capable of operating in accordance with the present invention.

Referring initially to FIG. 1, a system capable of operating in accordance with the present invention preferably comprises a fluid flow line 10, a pre-polarization module 12, a magnetic resonance module 14, and a controller 16. Flow line 10 may be any line capable of carrying a fluid, and preferably capable of carrying a multiphase fluid. Flow line 10 is preferably horizontal and may in some instances be a pipe such as are used for transporting crude oil or other hydrocarbon products, which may in turn include gaseous and/or liquid hydrocarbons and liquid water or other hydrogen-bearing contaminants, such as $H_2S$. Flow line 10 passes through pre-polarization module 12 and magnetic resonance module 14, preferably concentrically, so that fluid flowing through line 10 is exposed to the magnetic fields applied by pre-polarization module 12 and magnetic resonance module 14.

Pre-polarization module 12 comprises a means for providing a magnetic field and preferably but not necessarily comprises a means for providing a magnetic field of variable effective length. In some embodiments, pre-polarization module 12 may comprise one or more Halbach arrays of magnets.

Magnetic resonance module 14 preferably includes at least one coil capable of applying a radiofrequency (RF) pulse sequence. The coil may be wound in a solenoid configuration, a saddle configuration or in any other suitable configuration that results in application of a predictable magnetic field oriented perpendicularly to the background magnetic field, and covering the entire volume of fluid inside module 14.

Flow line 10 is preferably constructed from non-magnetic materials for the section located inside the pre-polarization modules, and is constructed from non-conductive materials for the section located inside the magnetic resonance module. If the RF- and gradient coils are mounted on the inside of the pipe, however, flow line 10 can be constructed from a non-magnetic but electrically conductive pipe material, such as stainless steel.

Still referring to FIG. 1, pre-polarization module 12 and magnetic resonance module 14 are preferably controlled by controller 16, which is preferably a microprocessor/computer such as are known in the art. If desired, controller 16 can be located remotely from modules 12 and 14 so as to simplify compliance with oil-field regulations.

In preferred embodiments, in order to ensure that laminar flow is established before the fluid enters the module, the system also includes a sufficient length of straight pipe upstream of the pre-polarization module 12. The length of straight pipe needed to ensure laminar flow depends on the range of expected fluid velocities in the pipe and may be a few to several meters.

It is also preferred but not necessary that the ID of meter be matched to and aligned as precisely as possible with the inside diameter of the pipe upstream of the meter, so as to minimize turbulent flow into the meter.

Also preferably provided is a magnetic field "catcher" that functions to remove any metallic debris from the fluid before it enters the meter. It is very common in the production of hydrocarbons that the produced fluid contains metallic debris from various sources, including particles of metal that have been scraped or chipped off the bit and other downhole tools, and other random metal fragments that may be present in the borehole. The magnetic field catcher is preferably positioned near the meter and upstream of it in the flow line, but far enough away to ensure that its magnetic field does not interfere with operation of the meter and that the magnetic polarization of fluids induced by the catcher has disappeared before fluids enter the pre-polarization module 12.

Finally, it is preferable to position and mount the meter so that it is mechanically isolated from vibration sources such as pumps and other equipment.

Still referring to FIG. 1, as will be understood, pre-polarization module 12 serves to orient certain atomic nuclei into a uniform orientation as they pass through it. Among the types of nuclei that can be oriented are those having an odd number of protons ($^1H$) or neutrons ($^{13}C$) or both protons and neutrons ($^2H$). Because hydrogen is abundant in both gaseous and liquid hydrocarbons and in water, it is useful to be able to assess the presence of hydrogen in typical oilfield fluids. Magnetic resonance module 14 serves as both a transmitter and a sensor, although not simultaneously. The magnetic field caused by the oriented nuclei is detectable by magnetic resonance module 14.

For a fluid flowing through the system, magnetic resonance module 14 will sense a diminishing field in which the reduction in signal amplitude over time is a result of both the flow of oriented nuclei out of magnetic resonance module 14 as well as the natural decay of the oriented state and the loss of phase coherence of precessing spins.

According to preferred embodiments of the invention, pre-polarization module 12 is operated for a desired interval and then changes effective length, while magnetic resonance module 14 applies a pulsed magnetic field to the fluid. During its "off" cycles, magnetic resonance module 14 acts as a sensor.

Figure 2:
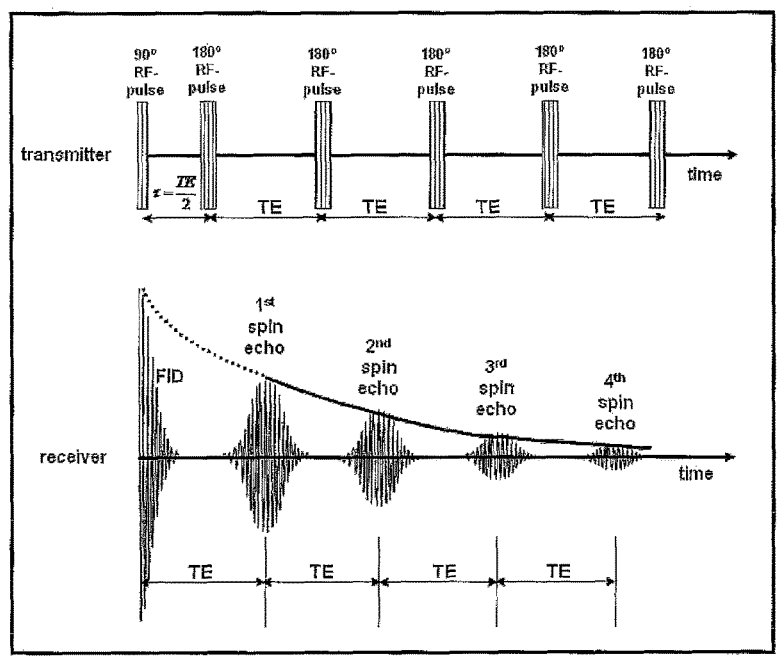
FIG. 2 is a schematic illustration of a plot generated and used in accordance with the present invention.

FIG. 2 illustrates the output from magnetic resonance module 14 and the signal sensed by it during a typical pulse sequence. The amplitude of the sensed field diminishes over time. Again, the reduction in amplitude over time is a result of both the flow of oriented nuclei out of magnetic resonance module 14 and the natural decay of the oriented state. Collected over the duration of each pulse sequence, these measurements are indicative of the volume fractions of at least two phases in a multi-phase fluid. As set out in U.S. Pat. Nos. 7,719,267 and 7,872,474, for short-time approximations and reasonable flow rates, the measured decay is often dominated by the flow of oriented nuclei and can be used as a flow measurement.

By way of example, a first measurement is made using a pulse sequence adapted to measure the transverse NMR relaxation time, T2. An example of a suitable sequence is a Can Purcell Meiboom Gill (CPMG) sequence. As is known in the art, a CPMG sequence is a spin echo pulse sequence consisting of a 90° radio frequency pulse followed by a train of successive 180° pulses, as illustrated with reference to the transmitter in FIG. 2. Typically, several hundreds to a few thousands of these RF pulses are applied in a single sequence. The resulting free induction decay (FID) and spin echoes are detected by the receiver of the flow meter after the initial 90° radio frequency pulse and between the 180° radio frequency pulses, as illustrated with reference to the receiver in FIG. 2. As can be seen, the envelope of the spin echo maxima decays exponentially with the time constant $T_2$. The extrapolation of the spin echo envelope to time zero, or the initial amplitude of the FID signal, yields the net magnetization. After calibration, the net magnetization is a direct measure of the number of nuclei in resonance and, hence, of fluid volume. Thus, in preferred embodiments, the slope/intercept determination is used in conjunction with a previously established calibration to determine flow velocity. These concepts are described at length in M. Appel and J. J. Freeman, and D. Pusiol, 2011. Robust Multi-Phase Flow Measurement Using Magnetic Resonance Technology. Paper SPE 141465 presented at the at the SPE Middle East Oil and Gas Show and Conference held in Manama, Bahrain, 6-9 Mar. 2011.

It has been determined that the foregoing technique is insufficient for measuring gas-liquid flow. To address that deficiency a new method has been discovered, which does not rely on a quantifiable diffusion contrast between the liquid and the gas phase. The new technique relies on the contrast in hydrogen indices between the gas phase, typically methane, and the liquid phase(s).

The derivation of hydrogen indices for reservoir fluids has been extensively discussed in the art. For proton (1H) NMR purposes, the hydrogen index (HI) is defined as the ratio of the amount of hydrogen in the sample and the amount of hydrogen in pure water at standard conditions (STP):

$$HI \equiv \frac{\text{Amount of hydrogen in sample}}{\text{Amount of hydrogen in pure water at } STP} \quad (1)$$

$$= \frac{\text{moles H/cm}^3}{0.111}$$

$$= \frac{\rho_m N_H / M}{0.111}$$

where $\rho_m$ is the mass density of the fluid in g/cm$^3$, $N_H$ is the number of hydrogen atoms in the molecule, and M is the molecular weight of the fluid. The denominator of the last expression, 0.111, represents the moles of hydrogen in one cubic centimeter of water at standard conditions. Consequently, the numerator is the number of moles of hydrogen in the same volume of the bulk sample at the conditions of the measurement.

The initial amplitude of a CPMG measurement as discussed above, without any field gradient, represents the fractions of the fluids in the sensed section of the pipe, weighted by the effect of outflow and hydrogen indices. At flowing tubing head pressures up to 1000 to 2000 psi, the signal of methane contributes to only 10%-15% of the measured NMR signal because of the low gas hydrogen index.

If a constant magnetic field gradient is applied during the entire CPMG pulse sequence, the entire NMR signal will be further attenuated proportionally to the intensity of the magnetic field gradient, the duration between subsequent 180° pulses, and the diffusivity of the fluids. It is understood that this constant magnetic gradient reduces the thickness of the tested slice; however, due to the broad bandwidth of the RF receiver and the low gradient intensity, the measured slice is typically still broader than the pipe cross-section.

Due to the high diffusion coefficient of a gas, at a given number of acquisition repetitions, the gradient-induced attenuation of the entire measured signal results in a suppression of the gas signal below detection levels. At the same time, the less diffusive liquid signal will still be measurable because of its higher initial (non-gradient) signal and strength. As a consequence, the NMR signal that is detected when a constant magnetic field gradients is applied will be dominated by the water- and oil responses.

Using a calibration between the ratio of slope and intercept and flow velocity for the individual liquid phases with the magnetic field gradient switched on during the CPMG RF pulse sequence, the flow velocity of the liquid phase can be determined. The magnetic field gradient may be constant or pulsed during the CPMG RF pulse sequence.

A second calibration between the signal intensity of the pure liquid phases as a function of flow velocity, with and without magnetic field gradient pulses applied, can be used to correct the gradient-induced attenuation of the liquid signal and to calculate the gradient-corrected signal intensity of the liquid phase in the absence of a constant gradient.

The ratio of the gradient-corrected intensity of the liquid phase to the intensity of the NMR signal of pure liquids measured at the previously-determined liquid flow velocity can be used to calculate the volumetric fraction of the liquid phase.

Further, subtracting the gradient-corrected liquid signal from the signal obtained in the absence of applied constant gradients yields the gas signal. The slope and intercept of this differential gas signal can be calibrated to gas flow velocity using a flow rate calibration for pure gas. The volumetric fraction of the liquid phase can be used to determine the volume fraction of gas. Multiplying this gas volume fraction by the previously-determined gas flow velocity and the cross-sectional area of the pipe gives the volumetric flow rate of the gas phase.

Figure 3:
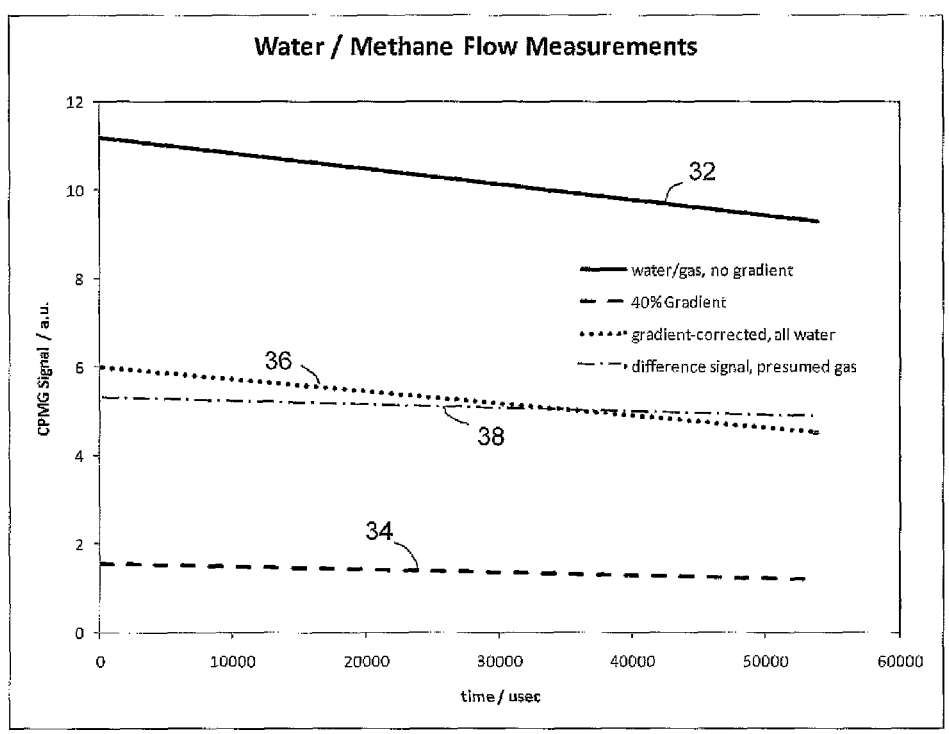
FIG. 3 is an illustration of the present methods applied to liquid-gas measurements for a water/methane flow in which water was flowing at 3.97 m$^3$/hr, gas at 1 m$^3$/hr.

The foregoing interpretation method has been successfully applied to several water/gas measurements. By way of example, FIG. 3 illustrates this procedure for water flowing at approximately 4 m$^3$/hr, and gas flowing at 1 m$^3$/hr. In FIG. 3, line 32 represents a CPMG measurement as discussed above, without any field gradients applied, line 34 represents the signal received in the presence of a gradient, line 36 represents the gradient-corrected signal intensity of the liquid phase in the absence of a constant gradient, and line 38 represents the gas signal obtained by subtracting the gradient-corrected liquid signal 36 from the original gradient-free signal 32.

Figure 4:
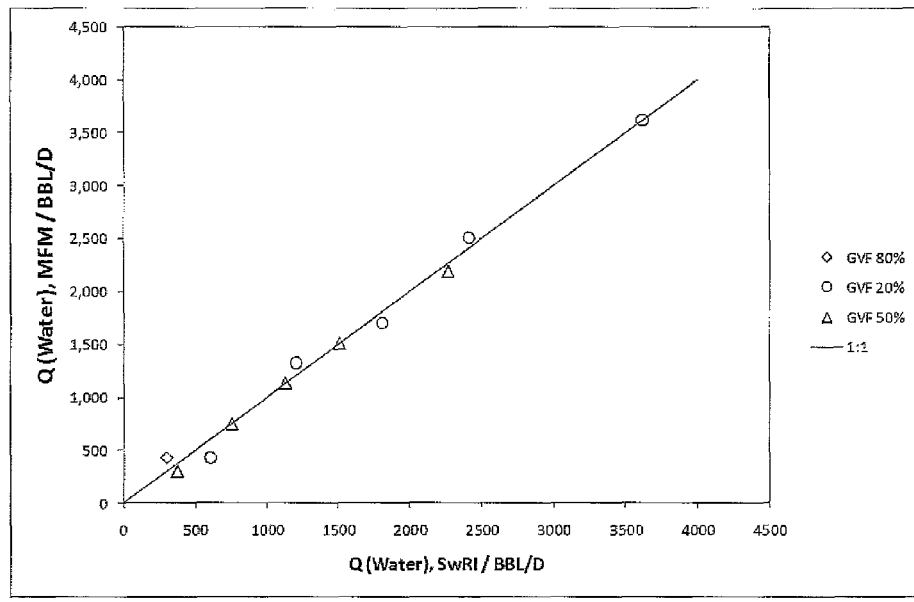
FIGS. 4 and 5 are plots showing the correlation between calculated and known values for water and gas flow rates, respectively, at three different gas volume fractions.
Figure 5:
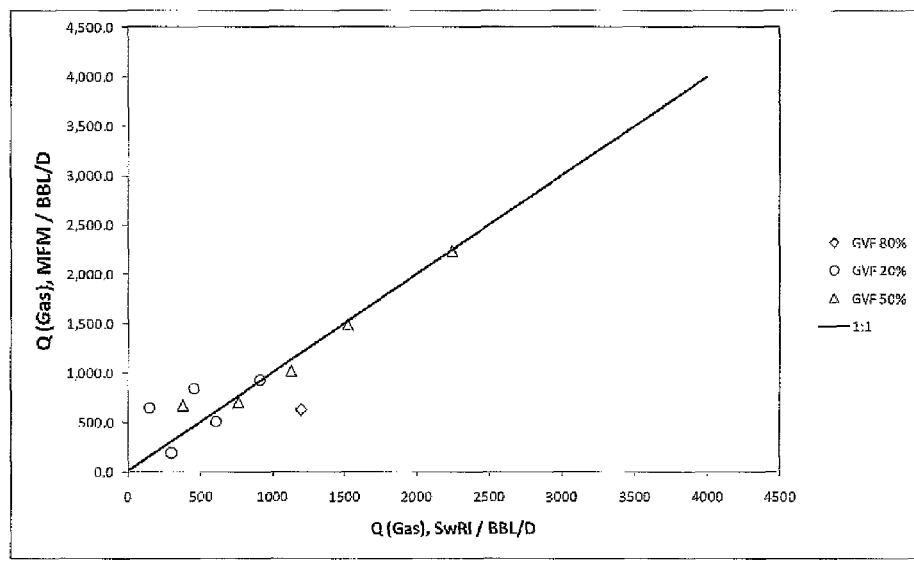

FIGS. 4 and 5 show the correlation between known flow rates and the results obtained using the method described above for water and gas fractions, respectively. The measurements covered three different gas-volume fractions and a variety of flow rates. As can be seen, the correlation between known and calculated values is high, especially for the liquid phase. Using horizontal sight glasses, it was noted that at a constant gas-volume fraction, the cross-sectional area occupied by gas decreased with increasing flow rate. This illustrates increasing slip velocity of the gas phase, and also implies that the water flow velocity increases less than proportionally with increasing flow rate because of a larger cross-sectional area available for flow. In addition, the changing cross-sectional areas demonstrate that the measurement of the combined fluid density does not provide information about the volumetric flow fractions.

In preferred embodiments, the system is configured to sense the signals received from each of a series of horizontal segments of the flow volume. Because less-dense fluids, such as gas, will migrate to the top in a multiphase system, "slicing" the flow horizontally allows the application of the method mentioned above for individual sections of stratified flow. Fluid composition and velocity(ies) can therefore be determined for each "slice" and it becomes possible to obtain more accurate characterization of the total flow.

The present invention has been found to provide meaningful characterization of fluid flows through the magnetic resonance module at less than 0.3 m/s, and even less than 0.2 m/s. Similarly, the present invention has been found to provide meaningful characterization of multi-phase fluid flows that include a gas and the gas flows through the magnetic resonance module at a pressure less than 15 MPa, or even less than 8 MPa.

While preferred embodiments of this disclosure have been described with respect to characterizing hydrocarbon/water mixtures, the invention is not limited to oil-field applications. The present invention is preferably but not necessarily applied in an oil production line, or in other conduits transporting multiphase fluids, for surface, subsurface, on- and offshore applications. For example, the measurement approach outlined herein can also be applied to any other technological field in which it is desirable to determine the make-up of a multi-phase fluid.

The invention claimed is:

1. A method for determining flow rates of gas and liquid phases in a multi-phase fluid flowing in a pipe without using time-of-flight measurements, comprising:
   a) providing a measurement and analysis magnetic resonance module through which the multi-phase fluid flows;
   b) providing a pre-polarization module through which the multi-phase fluid flows before entering the magnetic resonance module;

c) flowing the multi-phase fluid through the pre-polarization module and the magnetic resonance module;

d) as the multi-phase fluid flows through the magnetic resonance module, applying to the multi-phase fluid a radio-frequency pulse sequence at least once in the presence of a magnetic field gradient and at least once in the absence of a magnetic field gradient and measuring the intensity of a pre-determined number of spin echoes that are produced by the RF pulse sequence;

e) using a first calibration between the ratio of slope and intercept of the measured spin echoes and flow velocity for at least one non-gas phase with the magnetic field gradient applied to determine the flow velocity of that non-gas phase;

f) using a second calibration of the signal intensity of the non-gas phases as a function of flow velocity, with and without magnetic field gradients applied, to correct the gradient-induced attenuation of the non-gas signal and to calculate a gradient-corrected signal intensity of the non-gas phase;

g) subtracting the gradient-corrected signal intensity of the non-gas phase from the NMR signal of the multi-phase fluid measured at the liquid flow velocity determined in step e) to determine a signal that corresponds to the gas phase; and h) determining the volumetric fraction and flow velocity of the gas phase, wherein the gas flow velocity is determined using a flow rate calibration for pure gas in conjunction with the slope and intercept of the gas signal determined in step g).

2. The method of claim 1 wherein the radio-frequency pulse sequence is a CPMG pulse sequence.

3. The method of claim 1 wherein the magnetic field gradient is constant during the RF sequence.

4. The method of claim 1 wherein the magnetic field gradient is pulsed during the RF sequence.

5. The method of claim 1 wherein at least steps e) through h) are performed for a plurality of segments of the cross-sectional area of the flow.

6. The method of claim 5 wherein the segments of the cross-sectional area of the flow are horizontal segments.

7. The method of claim 6 wherein step h) further comprises multiplying the volume fraction of the gas by the gas flow velocity to yield a volumetric flow rate of the gas phase.

8. The method of claim 1 where in the gas of the multi-phase fluid flows through the magnetic resonance module at a pressure less than 15 MPa.

\* \* \* \* \*